US007028729B2

(12) United States Patent
Constantine et al.

(10) Patent No.: US 7,028,729 B2
(45) Date of Patent: Apr. 18, 2006

(54) APPARATUS AND METHOD FOR MANUFACTURING VENEER

(76) Inventors: Edward Joseph Constantine, 533 Burkes Dr., Coraopolis, PA (US) 15108; Richard Frederick Miller, 6625 Old Route 8 North, Valencia, PA (US) 16059

( * ) Notice: Subject to any disclaimer, the term of this patent is extended or adjusted under 35 U.S.C. 154(b) by 0 days.

(21) Appl. No.: 10/386,844

(22) Filed: Mar. 12, 2003

(65) Prior Publication Data

US 2004/0177897 A1 Sep. 16, 2004

(51) Int. Cl.
*B23Q 15/00* (2006.01)
*B27M 1/08* (2006.01)
*B27L 5/02* (2006.01)

(52) U.S. Cl. ...................... 144/332; 144/356; 144/357; 144/364; 144/380; 144/178; 144/212; 144/214

(58) Field of Classification Search ............. 144/162.1, 144/178, 179, 209.1, 214, 215, 332, 359, 144/363, 369, 376, 380
See application file for complete search history.

(56) References Cited

U.S. PATENT DOCUMENTS

| | | | | |
|---|---|---|---|---|
| 1,143,081 | A | 6/1915 | Shellenberger | |
| 2,576,520 | A | 11/1951 | Koss | |
| 3,265,103 | A | 8/1966 | Hervey | |
| 3,441,069 | A | 4/1969 | Koss | |
| 3,905,408 | A * | 9/1975 | Hale | 144/178 |
| 4,061,169 | A | 12/1977 | Hasegawa | |
| 4,102,372 | A | 7/1978 | Cremona | |
| 4,222,421 | A | 9/1980 | Walser et al. | |
| 4,323,101 | A | 4/1982 | Cremona | |
| 4,362,197 | A | 12/1982 | Wick et al. | |
| 4,503,896 | A | 3/1985 | Brand | |
| 4,516,614 | A | 5/1985 | Grimhall et al. | |
| 4,587,616 | A | 5/1986 | Weil | |
| 4,601,317 | A | 7/1986 | Brand | |
| 4,794,961 | A | 1/1989 | Bonac | |
| 5,159,963 | A | 11/1992 | Paajanen | |
| 5,381,841 | A * | 1/1995 | Weil | 144/215.3 |
| 5,385,184 | A | 1/1995 | Mellor | |
| 5,447,185 | A | 9/1995 | Koike | |
| 5,511,598 | A | 4/1996 | Brand | |
| 5,680,887 | A | 10/1997 | Brand | |
| 5,715,879 | A * | 2/1998 | Jones | 144/213 |

(Continued)

FOREIGN PATENT DOCUMENTS

JP 1271201 * 10/1989

*Primary Examiner*—Derris H. Banks
*Assistant Examiner*—Shelley Self
(74) *Attorney, Agent, or Firm*—The Webb Law Firm; Kent E. Baldauf, Jr.

(57) ABSTRACT

Disclosed is a veneer slicing apparatus including a table assembly. A blade support is mounted on the table assembly. A blade is supported in the blade support. A carriage assembly is adapted to engage and hold a log generally parallel to the table assembly. A drive assembly is configured to reciprocate the carriage assembly between a cutting stroke and a return stroke. During the cutting stroke, the log is passed over the blade to longitudinally cut a slice of veneer from the log. Disclosed is a method for manufacturing veneer. At least one log is received on a table assembly. The log is engaged by a carriage assembly. The log dwells in a ready position on a heated portion of the surface. The carriage assembly is moved to pass the log longitudinally over a blade supported on the table assembly to cut a slice of veneer.

22 Claims, 12 Drawing Sheets

U.S. PATENT DOCUMENTS 5,979,524 A 11/1999 Trost
5,996,656 A * 12/1999 Fezer .......................... 144/178
6,066,367 A * 5/2000 Nishibori .................... 427/274
6,102,090 A * 8/2000 Gruender et al. ........... 144/178
6,139,965 A 10/2000 Murai
6,298,888 B1 10/2001 Murai

* cited by examiner

APPARATUS AND METHOD FOR MANUFACTURING VENEER

BACKGROUND OF THE INVENTION

1. Field of the Invention

The present invention is directed to the manufacturing of veneer and, more particularly, to a reciprocating lengthwise veneer slicing apparatus and a method of its use.

2. Description of Related Art

Manufacturing veneer from logs is well-known. In general, veneer is either cut from logs using a vertical slicer or peeled from logs using a lathe. Typical vertical slicers cut the veneer cross-wise from the log, or against the grain. Typical lathe peelers cut the veneer from a rotating log.

Traditionally veneer has been produced by preparing trunks of various species of trees for a slicing operation in which thin sheets of veneer are produced which can later be made into articles of furniture or decorative wall paneling. Preparation involves shaping the tree trunk to a desired configuration and size to form a flitch. The shaping is usually performed by longitudinally sawing the trunk to give it a generally rectangular or semi-circular cross-sectional configuration.

After the flitch has been shaped, it is cooked in a vat of hot water, for example, 190° F., for a period of time sufficient to condition it for the slicing operation, that is, until the interior of the flitch has reached a desired temperature. The cooking operation conditions (i.e., heats) the flitch so that it will not splinter, split, or tear during slicing and improves surface smoothness and ease of cutting. The cooking time varies according to the specie of wood, but is generally 24–48 hours. Once a flitch reaches the proper temperature, the flitch is removed from the water bath and transported to the veneer slicer.

The vats of hot water are generally several feet deep to accommodate several flitches at a time. This creates a danger in that a person may fall into the vat of hot water. The vats also present sanitary/sewage issues regarding the maintenance and disposal of dirty and extractive contaminated water.

Veneer slicers come in many forms and traditionally work by reciprocating the flitch vertically against the blade as the blade moves forward or upward into the flitch. A reciprocating veneer slicer typically has a reciprocating flitch table and a blade and nosebar carriage. The flitch table holds the flitch and reciprocates generally in a vertical plane. During reciprocation, the flitch is passed over the blade to cut a slice of veneer and then returns to its initial position.

The blade and nosebar carriage is incrementally advanced toward the flitch table so that veneer slices of uniform thickness are cut from the flitch during each cutting stroke. In order to return the flitch and flitch table to their initial position without interfering with the blade and nosebar, conventional systems have utilized means for tilting the blade and nosebar back away from the flitch table to insure that the flitch and flitch table clear the blade and nosebar during the return stroke. A gap is provided between the nosebar and the blade through which a veneer sheet passes as it is sliced from the flitch.

Conventional systems have normally utilized feed screws for advancing the blade and nosebar carriage toward the flitch table. Typically, the blade and nosebar carriage is advanced an incremental distance toward the flitch table during each rotation or portion of a rotation of the feed screw. Generally, a mechanical means is provided so that the blade and nosebar carriage is advanced the incremental distance during a very small portion of the rotation and is then held stationary by the mechanical means during the rest of the rotation. It is during this dwell that a sheet of veneer is sliced. A disadvantage of such systems is that the thickness of the veneer slice is determined by the mechanical movement limiting means, specifically, by the increment of advance of the feed screw which moves the carriage. Therefore, the slice thickness is difficult to vary.

In some slicers, a control system is provided for advancing and retracting the blade and nosebar carriage. This system replaces the feed screw and permits the blade and nosebar tilt mechanism to be eliminated. The control system includes a linear actuator for incrementally advancing and retracting the carriage and a programmable linear motion controller for controlling the sequence in which the linear actuator advances and retracts the carriage and the distance in which the linear actuator advances and retracts the carriage. This method does allow for more rapid change in thickness than the feed screw.

The flitch is conventionally held against a flat surface of the flitch table by mechanical clamps, commonly called "dogs". This entire assembly is moved in the vertically reciprocating motion. Using dogs to hold the flitch in place results in wasted material, since the thickness of the flitch between the flat holding surface and the top of the dog cannot be sliced by the blade. The remaining material, commonly called a "backing board", is often approximately 20 millimeters in thickness. Thus, the conventional dog clamping systems result in considerable waste of material.

Another problem caused by using dogs to hold the flitch in place is that uneven pressure exerted by the dogs, coupled with the reduced strength of the flitch as material is cut away, can cause the flitch itself to bend or curl during the latter slicing stages. This results in an inferior product and wasted material.

As the flitch is sliced into veneer sheets, the blade becomes dull. Eventually, the machine operator will need to rotate the blade about the pivot axis to adjust the angle of attack to maintain an improved cutting edge presented to the flitch or replace the blade. To facilitate adjusting the angle of attack, a pair of adjusting screws is coupled to the carriage and to the blade. By turning the screws, the blade is lifted relative to the carriage to rotate the blade about the pivot axis. As the blade rotates about the pivot axis, the angle of attack of the blade changes relative to the flitch.

Another adjustment that must be performed prior to initiation of a slicing operation is to position the nosebar with respect to the edge of the blade. The nosebar provides support for the veneer sheet as it is being sliced. In order to produce a high-quality sheet of uniform thickness, the nosebar must be accurately positioned with respect to the cutting edge of the blade.

Conventionally, the nosebar is mounted to a nosebar support means which, in turn, has a large feed screw at each end thereof. Adjustment of the horizontal position of the plate is accomplished by manually rotating the two screws, causing the ends of the nosebar support means and the nosebar mounted thereto to move forward or backward. An operator moves back and forth from one side of the apparatus to the other, checking the alignment of the nosebar and the blade edge by hand upon each rotation of the screws until satisfied that the nosebar and the blade edge are properly positioned relative to one another across the entire length of the blade (commonly 13–17 feet). In this system, it is difficult to move the nosebar by the very small and precise amounts needed for accurate positioning. Thus, the procedure tends to be somewhat time-consuming and requires an operator of substantial skill.

The rapid oscillation of the nosebar and blade places a substantial strain on the equipment. It is frequently necessary to adjust the settings of the blade and nosebar. Also, it is necessary to change the settings when changing from one flitch to another, particularly, if the flitches are of different woods or at significantly different temperatures. Additionally, during the operation of the apparatus, it often becomes necessary to stop the system for one reason or another. For example, the apparatus might jam, a flitch might fall off of the flitch table, or the flitch may have a nail or other foreign object embedded therein, which must be removed to avoid damaging the blade. In such circumstances, the apparatus must be stopped, and the carriage must be moved away from the flitch table for servicing. After servicing is completed, the carriage must be returned to the correct position to continue the slicing operation. This is a relatively time-consuming operation which significantly increases the downtime of the apparatus.

In a longitudinal lumber slicing apparatus, prepared logs are queued on a conveyor system. One-by-one, the logs pass over a blade and return to the conveyor system. Thus, one slice of veneer is cut from each log before another slice is cut from any log. Maintaining the sequence of the veneer cut from each log becomes complicated.

BRIEF SUMMARY OF THE INVENTION

It is an object of this invention to provide a veneer slicing apparatus that longitudinally slices veneer from a whole or sectional log and overcomes the deficiencies of the current art.

A veneer slicing apparatus according to the present invention includes a table assembly, a blade support mounted on the table assembly, a blade supported in the blade support, a carriage assembly adapted to engage and hold a log generally parallel to the table assembly, and a drive assembly configured to reciprocate the carriage assembly between a cutting stroke and a return stroke, wherein during the cutting stroke, the log is passed over the blade to longitudinally cut a slice of veneer from the log.

A method for manufacturing veneer according to the present invention includes receiving a log on a table assembly, engaging the log from the top and sides of the log with a carriage assembly, dwelling the log in a ready position on a heated portion of the table assembly, passing the log over a blade in the table assembly to longitudinally (or lengthwise) cut a slice of veneer from the log, and returning the log to the ready position in preparation for cutting another slice of veneer. These steps are repeated until the log has been depleted of veneer slices. Thus, the log is reciprocated lengthwise over the blade for longitudinally cut veneer.

By heating the log on the table assembly itself, several advantages are realized over the current slicing apparatuses. First, the logs need not be heated in vats of hot water. This reduces costs by eliminating the vats altogether and reducing the amount of logs in inventory. Additionally, safety and maintenance are improved by eliminating the water baths. Furthermore, the process becomes more energy efficient since there is no loss of heat during transport of log from the hot water bath to the slicing apparatus. Finally, overall cutting quality is significantly improved by maintaining a narrow temperature range at the time of cutting.

By engaging the log from the top and sides, any log can be sliced. Therefore, a flitch does not need to be prepared in which imperfections in the log are removed prior to slicing. The shape of the log is unimportant except that the side from which veneer is to be sliced should be prepared (by cutting off a portion of the log) prior to the first cut.

By reciprocating the log lengthwise, any length of log may be cut, with a maximum length dependent on a stroke length of the carriage assembly. Thus, short logs may be cut and long logs may be cut.

The carriage assembly may be adapted to engage at least two logs at a time. In such configuration, the logs need not be the same diameter or length. The sequences of the two (or more) logs are easily maintained by a veneer capturing system.

DETAILED DESCRIPTION OF THE INVENTION

Figure 1:
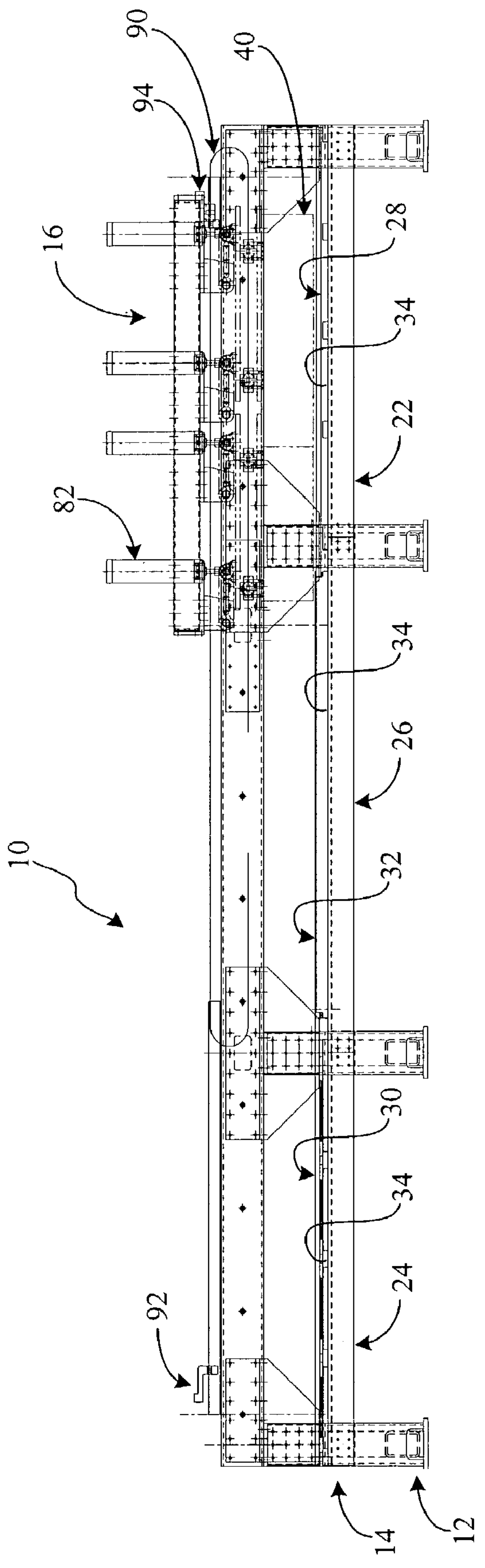
FIG. 1 is a side view illustration of a veneer slicing apparatus according to the present invention.
Figure 2:
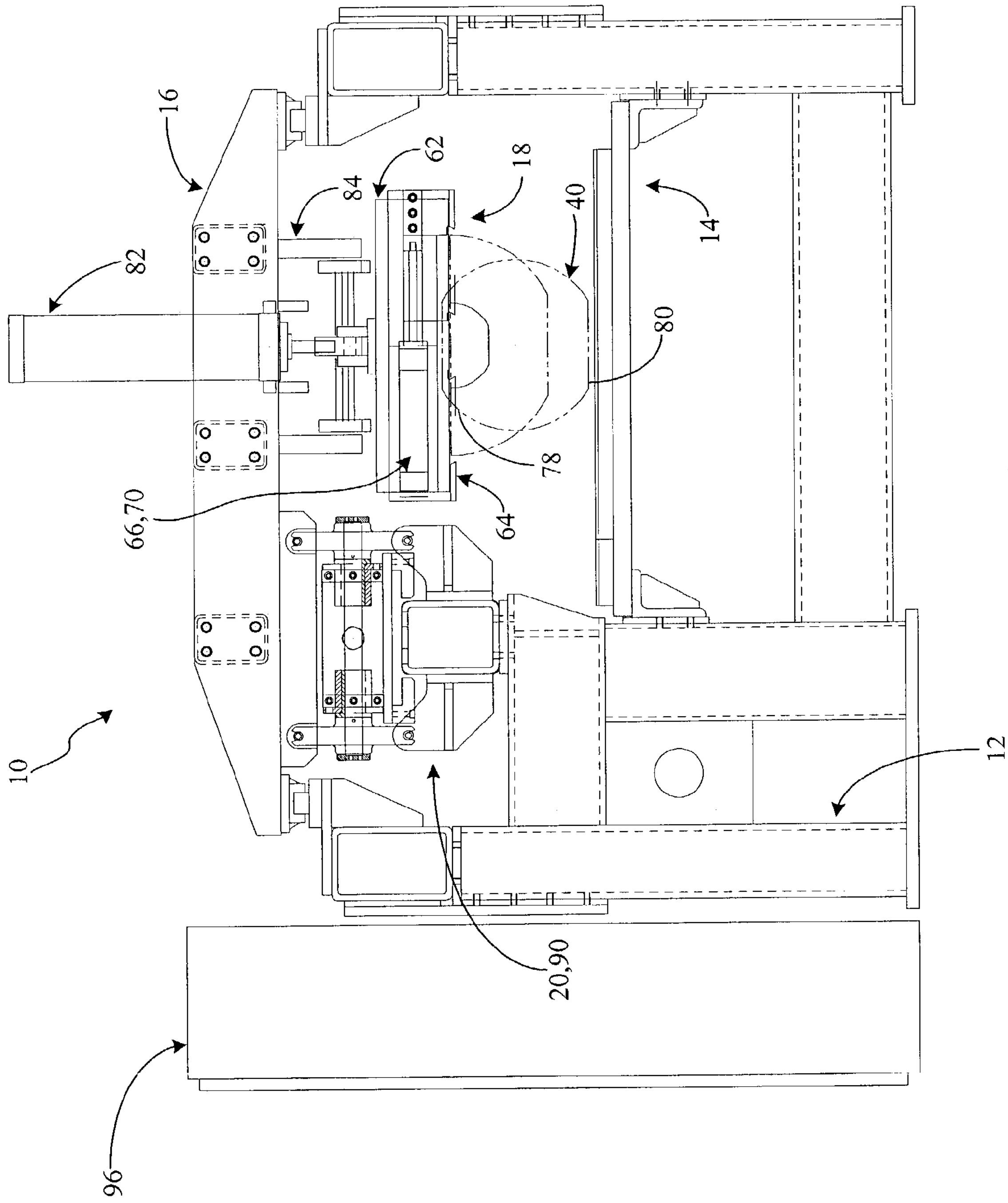
FIG. 2 is an end view illustration of the veneer slicing apparatus shown in FIG. 1.
Figure 3:
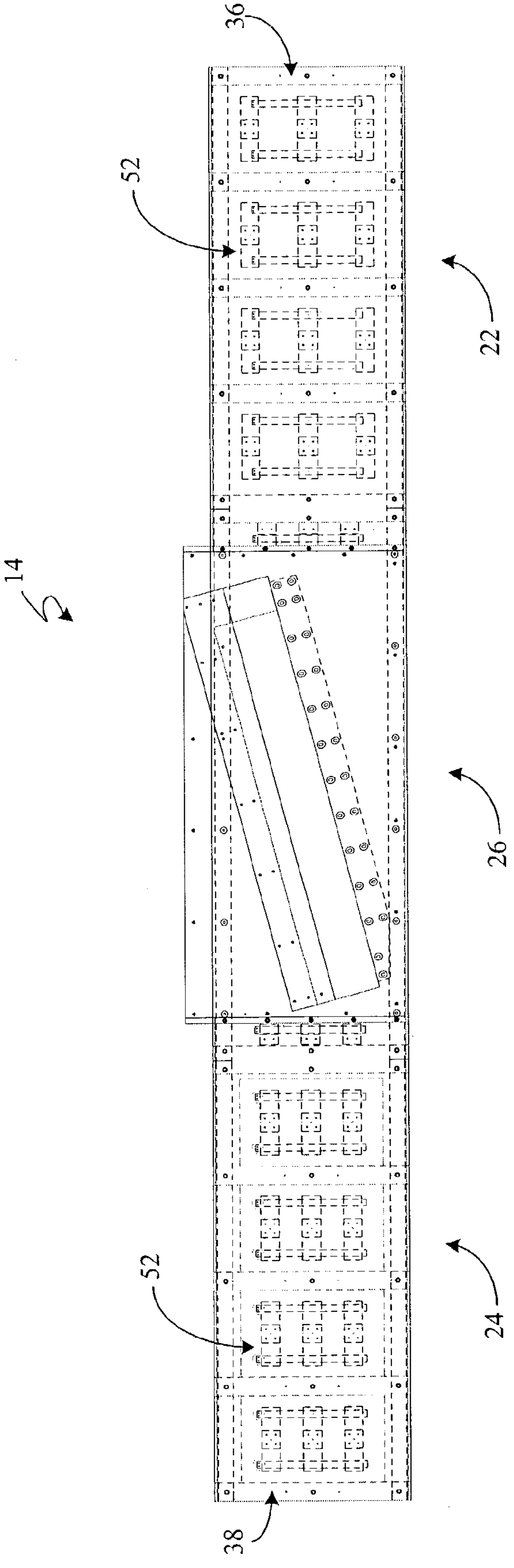
FIG. 3 is a top view illustration of a table assembly of the veneer slicing apparatus.
Figure 4:
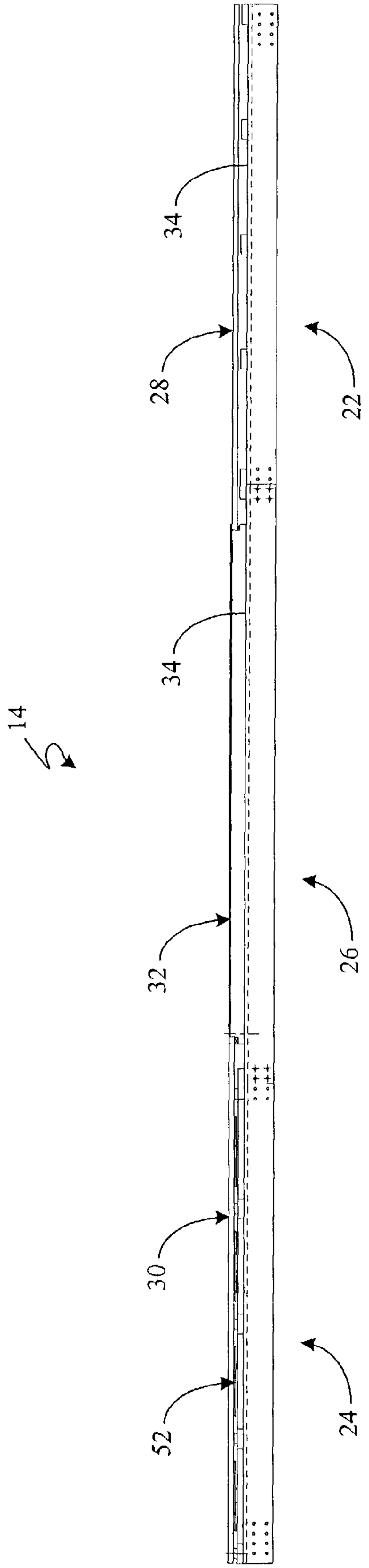
FIG. 4 is a side view illustration of the table assembly shown in FIG. 3.
Figure 5:
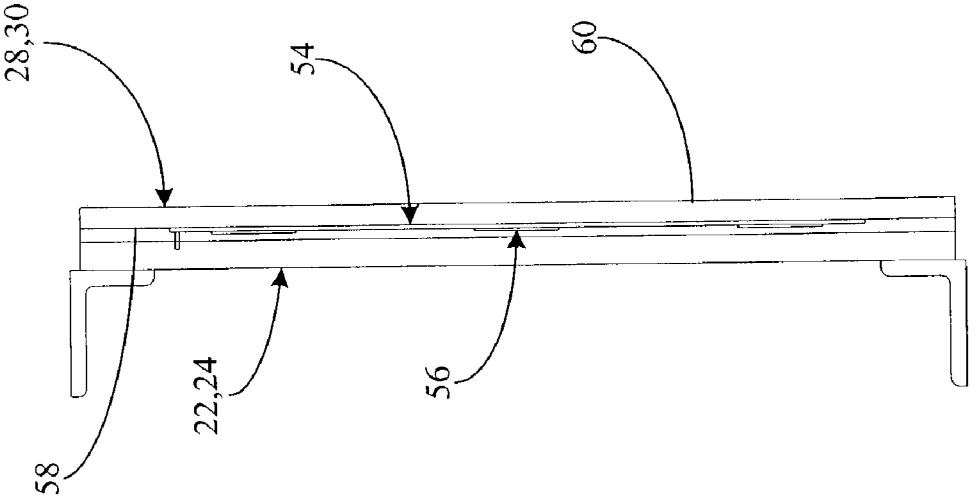
FIG. 5 is a end view of an end plate (first and/or second) of the veneer slicing apparatus.
Figure 6:
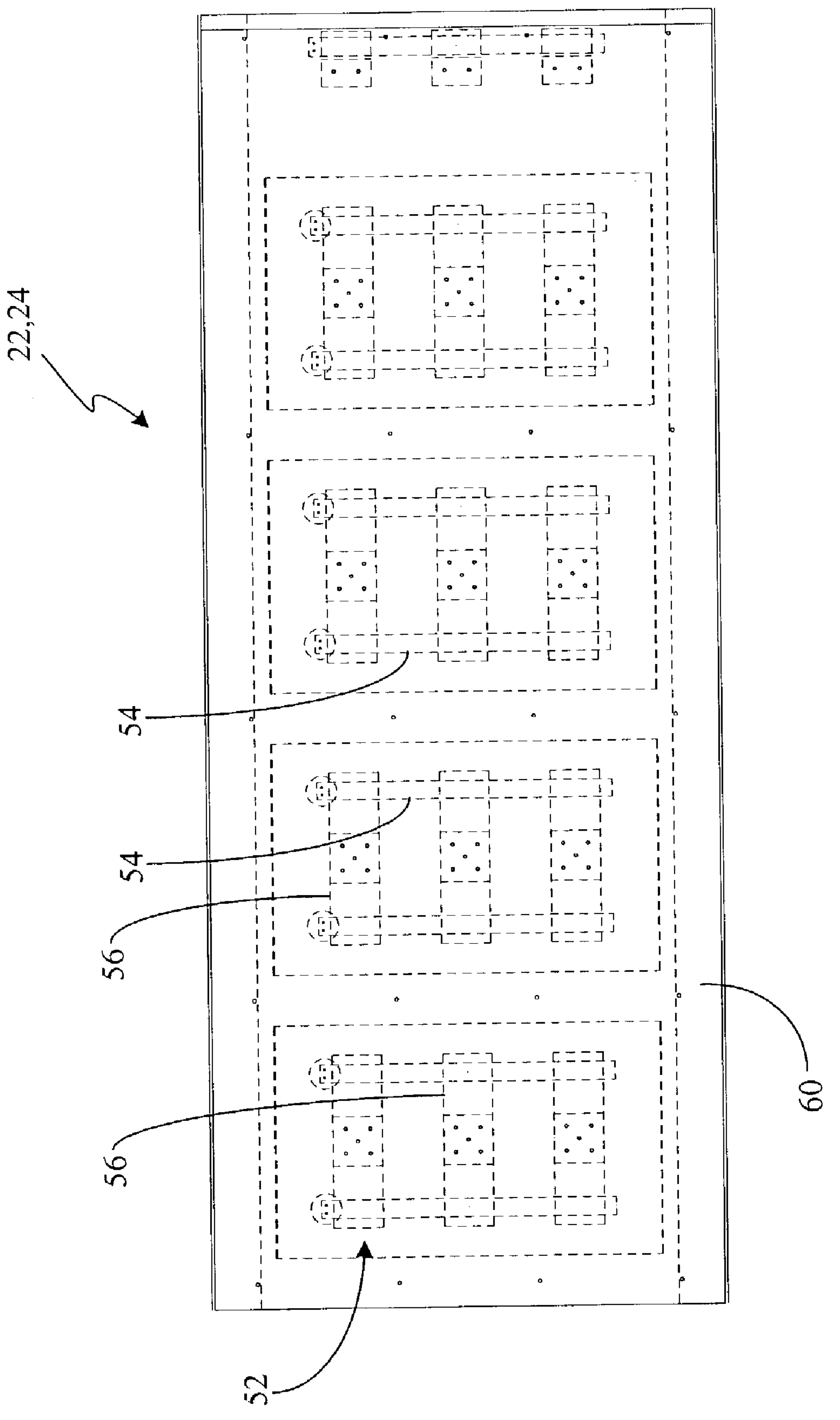
FIG. 6 is a top view illustration of the end plate shown in FIG. 5.

A complete understanding of the invention will be obtained from the following description when taken in connection with the accompanying drawing Figures, wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing Figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Generally, according to the present invention, veneer is manufactured by first receiving a log on a table assembly. The log is engaged with a carriage assembly. The log dwells in a ready position on a heated portion of the table assembly.

The log is passed over a blade in the table assembly during a cutting stroke to longitudinally (or lengthwise) cut a slice of veneer from the log. The log is returned to the ready position during a return stroke. These steps are repeated until the log has been depleted of veneer slices.

Referring to FIGS. 1–5, a veneer slicing apparatus 10 includes a main frame 12 supporting a table assembly 14, a carriage assembly 16, a gripper assembly 18, and a drive assembly 20. The table assembly 14 is generally rectangular and includes a first end plate 22, a second end plate 24, and a center plate 26. The center plate 26 is positioned longitudinally between the first end plate 22 and the second end plate 24. The first end plate 22, the second end plate 24, and the center plate 26 may include a first end wear plate 28, a second end wear plate 30, and a center wear plate 32, respectively, which protects top surfaces 34 of the first end plate 22, the second end plate 24, and the center plate 26 during use.

The first end plate 22 and the second end plate 24 preferably have a first end marker 36 and a second end marker 38, respectively, that indicates a general area for a log 40 to be placed on the table assembly 14 for loading purposes, for example, a scribe line on the table assembly 14 to indicate where an end of the log 40 is to be positioned.

Figure 7:
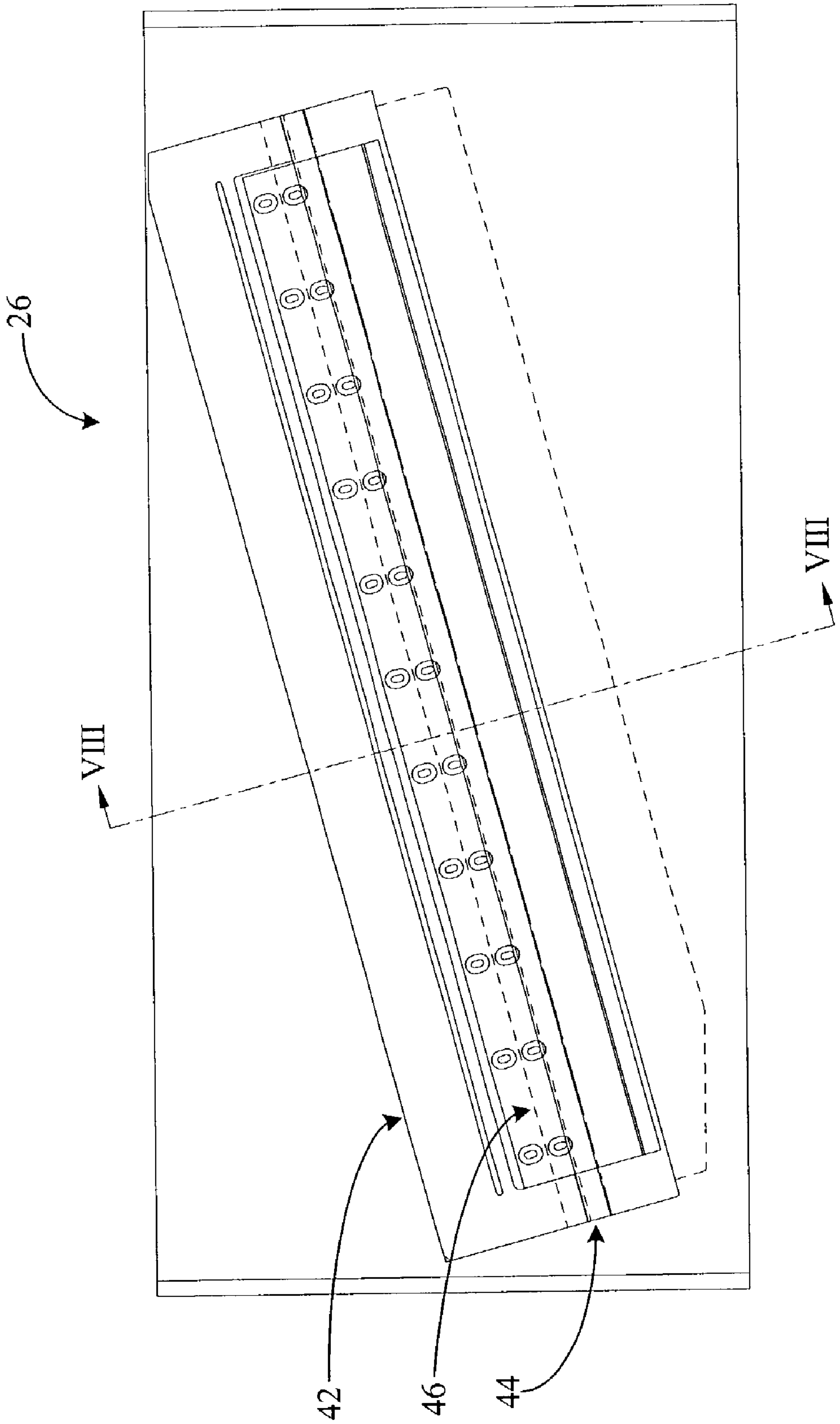
FIG. 7 is a top view illustration of a center plate of the veneer slicing apparatus.
Figure 8:
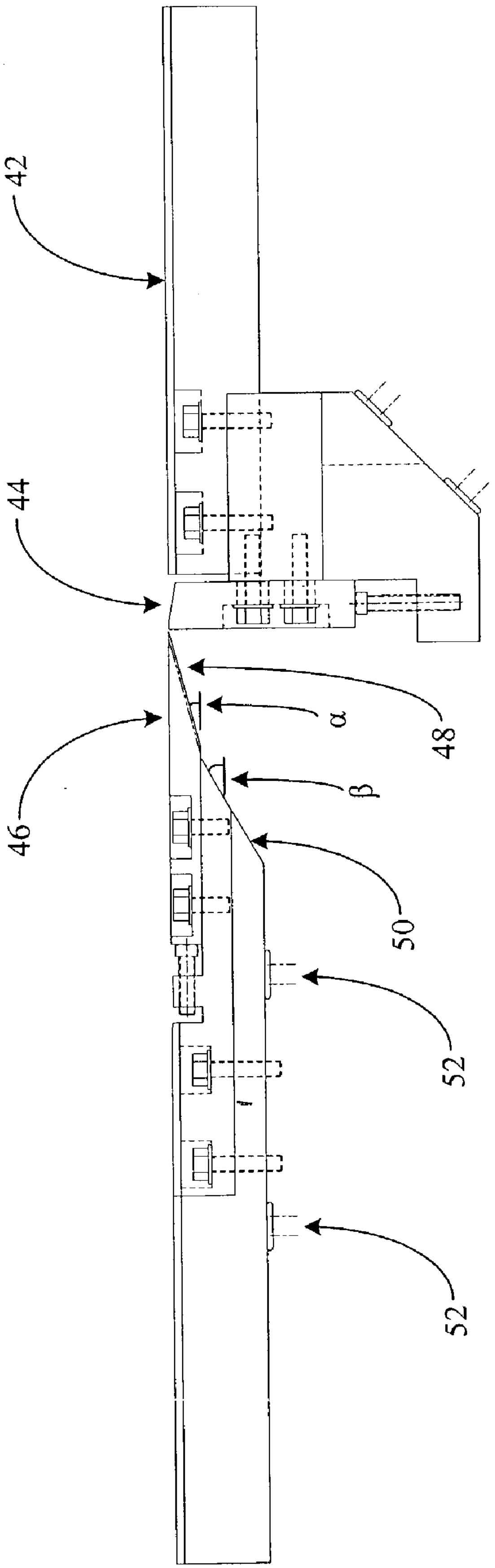
FIG. 8 is a cross-sectional view illustration of the center plate shown in FIG. 7 taken along line VIII—VIII.
Figure 9:
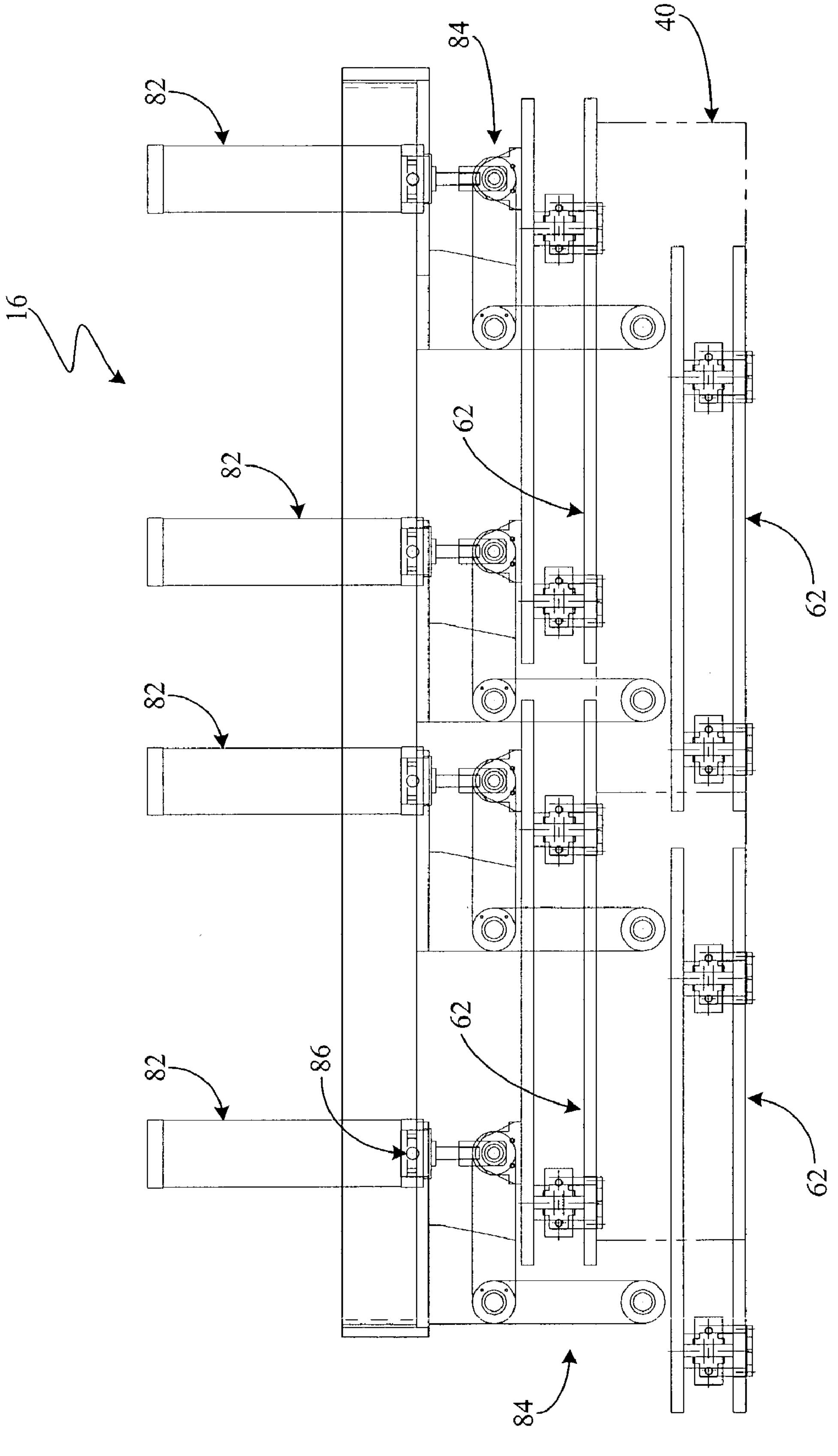
FIG. 9 is a side view illustration of a carriage assembly of the veneer slicing apparatus.
Figure 10:
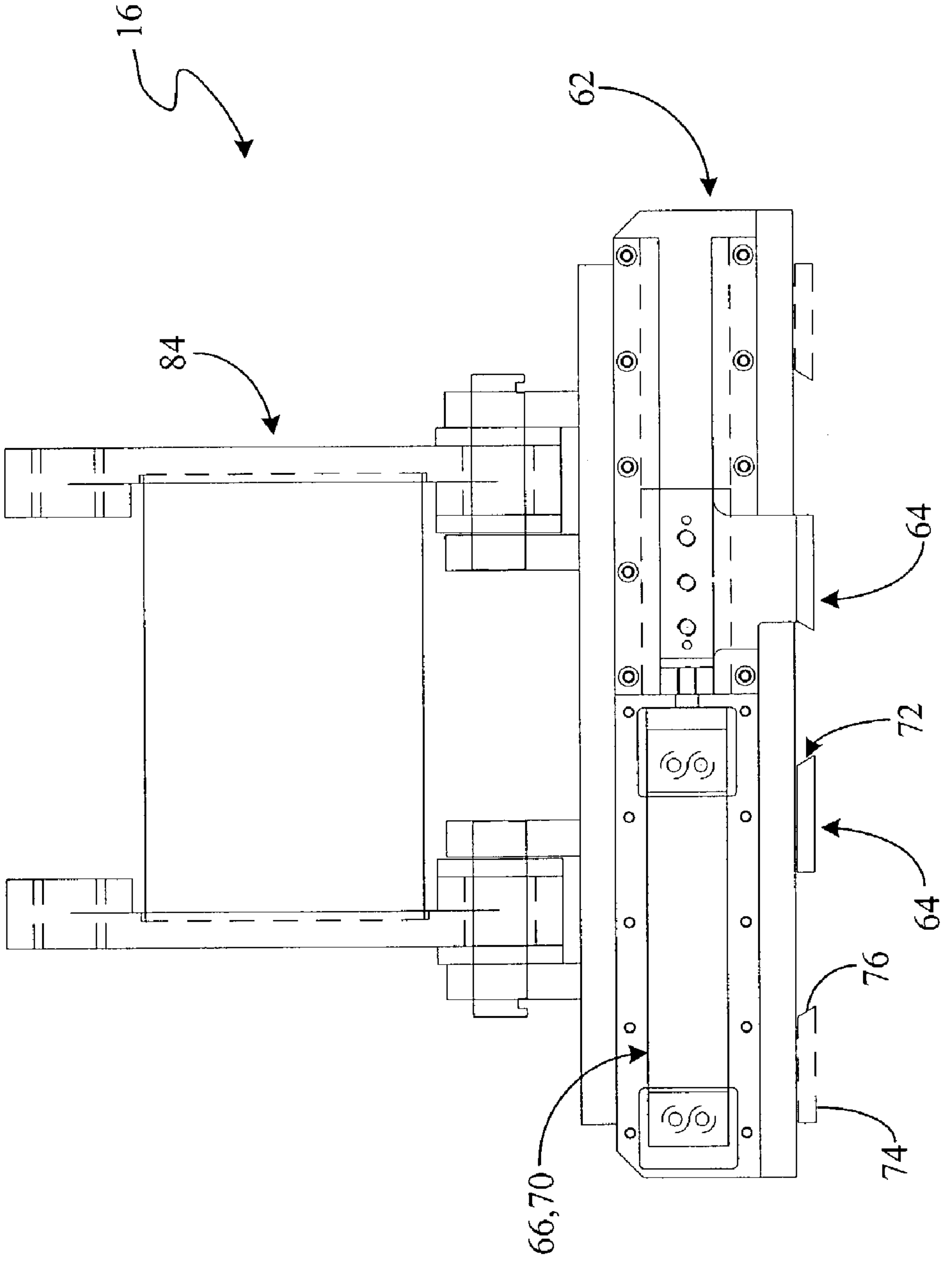
FIG. 10 is an end view of the carriage assembly shown in FIG. 9 in relation to a log.
Figure 11:
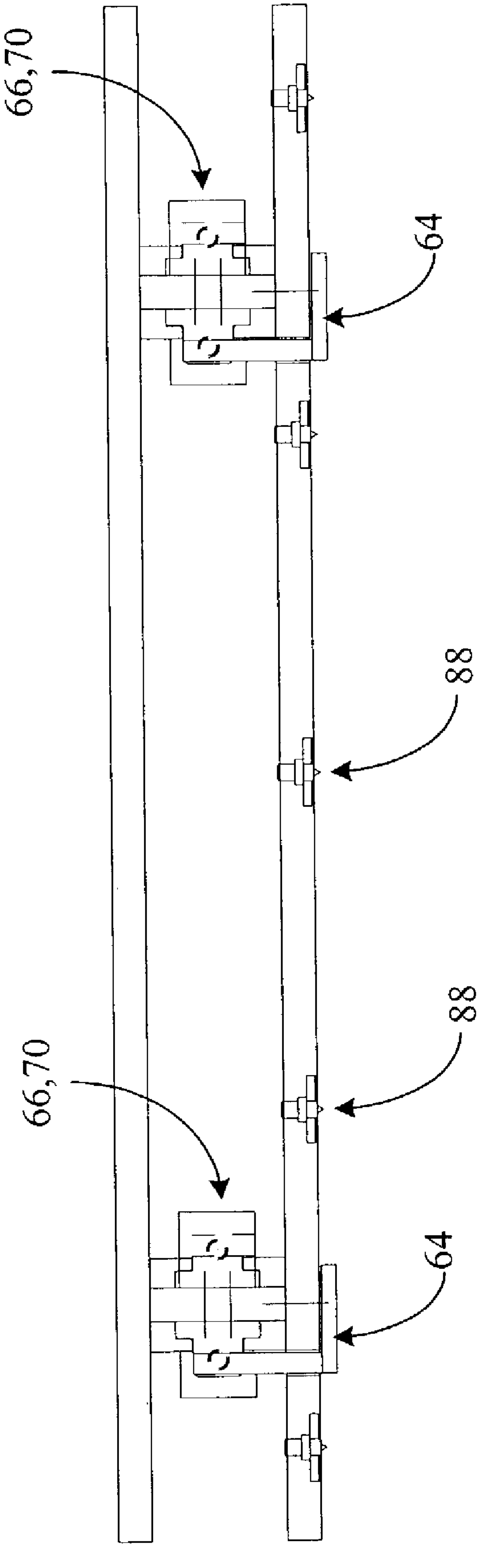
FIG. 11 is a side view of a portion of the carriage assembly-shown in FIG. 10 with a plurality of pins.
Figure 12:
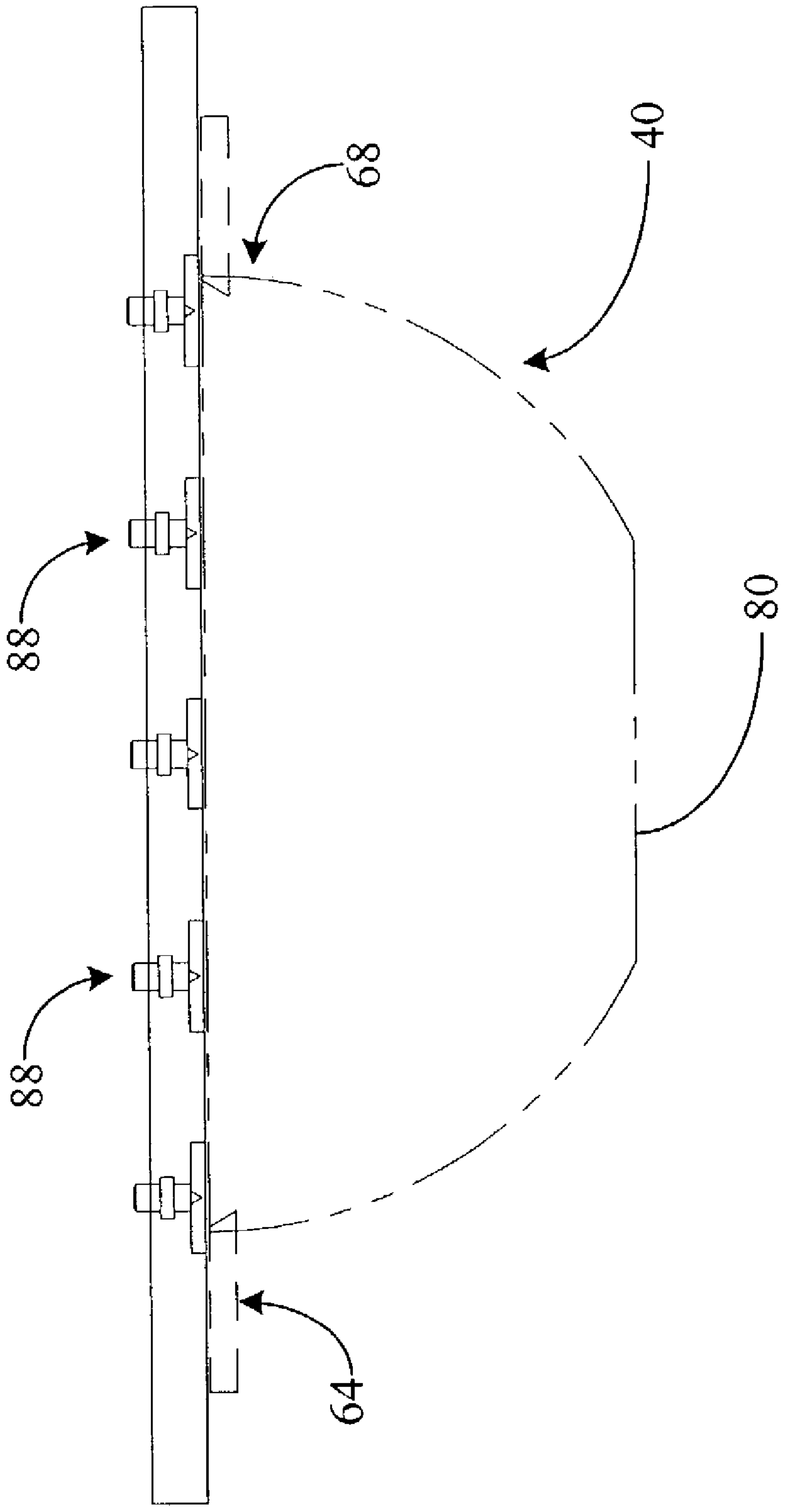
FIG. 12 is an end view of a portion of the carriage assembly shown in FIG. 10 engaging a log.

Referring to FIGS. 7 and 8, a blade support 42 is located in the center plate 26 of the table assembly 14. The blade support 42 is configured to support a nosebar 44 and a blade 46 for cutting veneer slices from the log 40 as the carriage assembly 16 passes through the cutting stroke. The blade support 42 is mounted such that the nosebar 44 and the blade 46 are held at an angle to the longitudinal direction of the log 40. The nosebar 44 and the blade 46 are positioned such that a predetermined thickness of veneer is sliced from the log 40 during the cutting stroke.

The blade 46 is preferably a compound blade. In other words, the angle α of the blade 46 in a first portion 48 is different than the angle β of the blade 46 in a portion 50, for example, 20° in the first portion 48 and 15° in the second portion 50. The compound blade minimizes veneer deflection stress at the cut point, resulting in less of a difference between the "loose" side and the "tight" side of the veneer (i.e., less of a difference between the resulting elongation of the loose side and the compression of the tight side). Therefore, the veneer absorbs a stain finish more uniformly, regardless of whether the stain is applied to the loose or the tight side.

The nosebar 44 and the blade 46 are removable from the blade support 42 for maintenance and replacement, as necessary. Additionally, preferably, the blade support 42 is removable from the table assembly 14. As such, the nosebar 44 and the blade 46 may be set up (i.e., positioned for a desired thickness of cut veneer) in the blade support 42 "off-line", with the nosebar 44, the blade 46, and the blade support 42 together placed in the center plate 26 when ready.

Referring to FIGS. 3–6, the table assembly 14 includes a heat source 52 adapted to heat the top surface 34 of the table assembly 14 adjacent the log 40. Preferably, a plurality of heating elements, for example, heat strips 54 supported by heat strip supports 56, is positioned to conductively heat at least portions of the first end plate 22 and the second end plate 24. For example, the heat strips 54 may be adjacent a bottom side 58 of the wear plates 28, 30 of each of the first end plate 22 and the second end plate 24. The bottom side 58 of each wear plate 28, 30 is opposed a top side 60 of each wear plate 28, 30 which is adjacent the log 40 in use. Referring to FIG. 8, also, preferably, the nosebar 44 and the blade 46 are heated by the heat source 52. Thus, the heat source 52 heats the table assembly and, in turn, heats the log 40 sitting on the table assembly 14.

Referring to FIGS. 1, 2, and 9–12, the carriage assembly 16 is mounted to the main frame 12 to be located generally parallel to the table assembly 14. The carriage assembly 16 is adapted to reciprocate lengthwise relative to the table assembly 14. The gripper assembly 18 is mounted to the carriage assembly 16 and, likewise, reciprocates lengthwise relative to the table assembly 14.

The gripper assembly 18 includes a platen 62 supporting at least one pair of clamps 64. The at least one pair of clamps 64 is positioned between the platen 62 and the table assembly 14 to support the log 40 above the table assembly 14. The at least one pair of clamps 64 is movable, through a gripper actuator 66, to engage sides 68 of the log 40 and to carry the log 40 during the cutting and return strokes. Preferably, two pairs of clamps 64 are used to engage and carry the log 40. One pair of clamps 64 is aligned near each end of the log 40. Preferably, at least one pneumatic cylinder 70 controls the movement of the at least one pair of clamps 64 and, more preferably, a separate cylinder 70 controls each clamp 64.

Each of the at least one pair of clamps 64 may have an angled edge 72 for improved grip (or bite) on the log 40. For example, a bottom 74 of each clamp 64 may be generally parallel to the table assembly 14, while a top 76 of each clamp 64 may be at an angle off vertical, for example, 30°.

The gripper assembly 18 essentially engages the sides 68 of the log 40 from a top 78 of the log 40, while the blade 46 cuts a bottom 80 of the log 40. Thus, the log 40 is carried by the top 78 and cut from the bottom 80. Since the at least one pair of clamps 64 engage the sides 68 of the log 40, a "log", per se, can be sliced by the veneer slicing apparatus 10. In other words, it is not necessary to have a clean, cut piece of lumber (four sides prepared) for slicing; a log 40 of any quality or shape may be sliced after just the top and bottom are prepared for the slicing process. Thus, the veneer slicing apparatus 10 may slice logs 40 with knots and bumps from cut limbs or other damage. Furthermore, a straight edge guide is not required with the gripper assembly 18 of the present invention.

The platen 62 of the carriage assembly 16 is adapted to be moveable toward and away from the table assembly 14. Prior to the cutting stroke, the platen 62 is moved toward the table assembly 14 until the log 40 contacts the table assembly 14. Then, during the cutting stroke, the platen 62 is maintained in this position, such that the log 40 contacts the table assembly 14 and the blade 46. Thus, a slice of veneer is cut from the log 40 during the cutting stroke. During the return stroke, the platen 62 is moved away from the table assembly 14 such that the log 40 is lifted off of the table assembly 14. By lifting the log 40 during the return stroke, the log 40 does not drag across the table assembly 14, thereby protecting the next slice of veneer from damage, such as scratching, that may result from dragging the log 40 over the table assembly 14 prior to the next cut.

The platen 62 is moved toward and away from the table assembly 14 preferably by at least one platen actuator 82, for example, a pneumatic cylinder, and a linkage mechanism 84. The pressure of the cylinder may be controlled in order to control the amount of pressure exerted by the log 40 on the table assembly 14 (through the linkage mechanism 84 and the platen 62) and, therefore, on the nosebar 44 and the blade 46. The combination of the cylinder and linkage mechanism 84 allows for approximate consistent pressure of the log 40 against the nosebar 44 (i.e., compression at the nosebar 44) and the blade 46, regardless of the size of the log 40 during the cutting stroke (i.e., a narrow edge of the log 40 or a thicker middle area). This allows for more uniform veneer slices.

A sensor 86 is positioned for determining when the log 40 has been depleted as much as possible. In other words, the sensor 86 indicates when the maximum amount of veneer has been sliced, given the size of the log 40 and the equipment constraints (i.e., the size and position of the at least one pair of clamps 64 engaging the log 40). For example, the sensor 86 may detect when a piston of the cylinder is fully extended, an indication that the platen 62 is as far down as it can go and no more veneer is able to be cut from the log 40.

The carriage assembly 16 may include two platens 62, and associated pairs of clamps 64, aligned in series. Thus, the carriage assembly 16 may engage and hold two logs 40, of different thickness (height), situated end to end, with each log 40 being longitudinally sliced during the cutting stroke. The sliced veneer from each log 40 would be accumulated separately, thus, maintaining two sequences of cut veneer.

Extending from the platen 62 is a plurality of pins 88 adapted to engage the top 78 of the log 40. The plurality of pins 88 preferably is replaceable. For example, each of the plurality of pins 88 may have a threaded end that cooperates with a correspondingly threaded hole in the platen 62. The plurality of pins 88 aid in securing the log 40 during the cutting stroke by providing points of traction as the log 40 (or logs) are passed over the blade 46.

The drive assembly 20 controls the reciprocating movement of the carriage assembly 16 between the cutting stroke and the return stroke. In a preferred embodiment, the drive assembly 20 includes at least one hydraulic cylinder and pulley system 90. The combination hydraulic cylinder and pulley system 90 permits a longer carriage assembly 16 stroke than with a cylinder alone. For example, the use of pulleys may double the stroke length as compared to use of a cylinder alone. The combination cylinder and pulley system 90 also provides for a consistent linear cut rate of motion, regardless of any resistance that may be encountered, for example, due to knots in the log 40.

The cutting stroke initiates with the log 40 in the first end plate 22 and terminates with the log 40 in the second end plate 24. The return stroke initiates in the second end plate 24 and terminates in the first end plate 22. The actual cutting of a slice of veneer occurs in the center plate 26. Thus, the carriage assembly 16 carries the log 40 through the first end plate 22, the center plate 26, and the second end plate 24 and then back to the first end plate 22.

The veneer slicing apparatus 10 also includes a cutting stroke stop 92 and a return stroke stop 94. The cutting stroke stop 92 limits a distance traveled by the carriage assembly 16 during the cutting stroke, and the return stroke stop 94 limits a distance traveled by the carriage assembly 16 during the return stroke. The cutting stroke stop 92 and the return stroke stop 94 are adjustable to vary the distance traveled by the carriage assembly 16 during the cutting stroke and the return stroke, respectively. Thus, the veneer slicing apparatus 10 is adjustable to cut different length logs 40 without unnecessary travel of the carriage assembly 16 when shorter logs 40 are being cut. This, in turn, reduces costs of operating the veneer slicing apparatus 10.

Preferably, each of the cutting stroke stop 92 and the return stroke stop 94 include a first sensor (not shown) and a second sensor (not shown). During travel of the carriage assembly, when the first sensor is triggered, the carriage assembly is slowed down. When the second sensor is triggered, the carriage assembly is stopped. This provides for a smoother stop at each end of carriage assembly travel.

A control system 96 controls the drive assembly 20 and the at least one pair of clamps 64 (i.e., the cylinders therefor). Preferably, the control system 96 can be preprogrammed to automatically operate the veneer slicing apparatus 10. Additionally, preferably, the control system 96 can be manipulated to manually control and/or adjust certain features of the veneer slicing apparatus 10, for example, adjust the cycle time of the cutting stroke, adjust the speed of the return stroke, operate a particular clamp 64, execute a cutting stroke, or move the carriage assembly 16 away from the table assembly 14.

In use, a log 40 is initially placed on the table assembly 14, on either the first end plate 22 or the second end plate 24, according to the first end marker 36 or the second end marker 38, if present. The carriage assembly 16 is positioned over the log 40. The platen 62 is moved toward the log 40 until the plurality of pins 88 engages the log 40. The at least one pair of clamps 64 is moved to engage the sides 68 of the log 40.

The carriage assembly 16 then positions the log 40, by lifting and moving the log 40 if necessary, in a ready position on the first end plate 22 of the table assembly 14 in preparation for the cutting stroke. Once the log 40 is in the ready position, an initial dwell period elapses where the log 40 simply sits on the table assembly 14. In the initial dwell period, the hot table assembly 14 (where the first end plate 22 is heated by the heat source 52) heats the log 40. The dwell period is long enough for a portion of the log 40 to reach a desired temperature. The portion of the log 40 to be heated is slightly thicker than the thickness of the veneer to be sliced.

After the initial dwell period, reciprocation of the log 40 begins for slicing veneer from the log 40. First, the cutting stroke of the carriage assembly 16 executes. For convenience, the dwell period may be considered the beginning of the cutting stroke. During the cutting stroke, the log 40 passes over and engages the nosebar 44 and the blade 46, thereby cutting a slice of veneer from the log 40. After the cutting stroke, the return stroke of the carriage assembly 16 executes. During the return stroke, the carriage assembly 16 lifts the log 40 off of the table assembly 14 and returns it to the ready position. A second dwell period elapses with the log 40 sitting on the table assembly 14 for heating. After the second dwell period, the cutting stroke executes, then the return stroke executes, and then the second dwell period elapses.

Reciprocation of the log 40 continues until the maximum amount of veneer is cut from the log 40, at which point the carriage assembly 16 stops reciprocating (i.e., stops either after the cutting stroke or after the return stroke). The at least one pair of clamps 64 disengage from the log 40. The carriage assembly 16 moves away from the log 40 for removal of the log 40 from the veneer slicing apparatus 10.

An operator typically places the log 40 on the table assembly 14 and manipulates the control system 96 to clamp the log 40 in the carriage assembly 16. Once the log 40 is clamped and the operator provides an appropriate signal, the control system 96 may continue the process of slicing veneer automatically, that is, without operator intervention, or may continue under operator manipulation. Preferably, the reciprocation of the carriage assembly 16 and the slicing of veneer continues until the sensor 86 indicates that the log 40 is depleted, at which time the veneer slicing apparatus 10 automatically stops slicing veneer. The release of the log 40 from the carriage assembly 16 may be achieved automatically or through operator manipulation of the control system 96. An operator typically removes the log 40 from the table assembly 14. The control system 96 is configured to allow the operator to control and/or adjust as few or as many operations and/or settings (individually or together) of the veneer cutting apparatus 10 and process as desired.

It will be understood by those skilled in the art that while the foregoing description sets forth in detail preferred embodiments of the present invention, modifications, additions, and changes might be made thereto without departing from the spirit and scope of the invention.

What is claimed is:

1. A veneer slicing apparatus, comprising:

a main frame;

a table assembly mounted on the main frame;

a blade support mounted on the table assembly;

a blade supported in the blade support;

a carriage assembly adapted to engage and hold a log generally parallel to the table assembly, wherein the carriage assembly is mounted to the main frame; and a drive assembly configured to reciprocate the carriage assembly between a cutting stroke and a return stroke, wherein during the cutting stroke, the log is passed over the blade to longitudinally cut a slice of veneer from the log, and during the return stroke, the log is lifted off of the table assembly.

2. The veneer slicing apparatus according to claim 1, wherein the carriage assembly includes a gripper assembly adapted to engage and hold the log.

3. The veneer slicing apparatus according to claim 2, wherein the gripper assembly includes at least one pair of clamps adapted to engage sides of the log.

4. The veneer slicing apparatus according to claim 2, wherein the gripper assembly includes a platen having a plurality of pins extending therefrom and adapted to engage a top of the log.

5. The veneer slicing apparatus according to claim 4, wherein the plurality of pins is removable.

6. The veneer slicing apparatus according to claim 1, wherein the carriage assembly is adapted to engage at least two logs situated end to end.

7. The veneer slicing apparatus according to claim 1, further including a cutting stroke stop and a return stroke stop, wherein the cutting stroke stop limits a distance traveled by the carriage assembly during the cutting stroke, and the return stroke stop limits a distance traveled by the carriage assembly during the return stroke.

8. The veneer slicing apparatus according to claim 7, wherein the cutting stroke stop and the return stroke stop are adjustable to vary the distance traveled by the carriage assembly during the cutting stroke and the return stroke, respectively.

9. The veneer slicing apparatus according to claim 1, wherein the table assembly includes a heat source that heats at least a portion of a surface of the table assembly.

10. The veneer slicing apparatus according to claim 1, wherein the drive assembly includes a hydraulic pump and pulley system for reciprocating the carriage assembly.

11. The veneer slicing apparatus according to claim 1, further including a control system for controlling the drive assembly.

12. The veneer slicing apparatus according to claim 3, further including a control system for controlling the drive assembly and the at least one pair of clamps.

13. The veneer slicing apparatus according to claim 1, further including a sensor adapted to sense when the log has been depleted of veneer.

14. A veneer slicing apparatus, comprising:

a table assembly including a heat source that heats at least a portion of a surface of the table assembly;

a blade support mounted on the table assembly;

a blade supported in the blade support;

a gripper assembly adapted to engage and hold a log generally parallel to the table assembly, the gripper assembly including a platen and at least one pair of clamps adapted to engage sides of the log; and a drive assembly configured to reciprocate the gripper assembly between a cutting stroke and a return stroke, wherein during the cutting stroke, the log dwells on the portion of the surface of the table assembly that is heated by the heat source and then is passed over the blade to longitudinally cut a slice of veneer from the log and during the return stroke, the log is lifted off of the table assembly.

15. A method for manufacturing veneer, comprising the steps of:

a) receiving at least one log on a surface of a table assembly;

b) engaging the log with a carriage assembly by positioning the carriage assembly over the log, lowering a gripper assembly over the log and engaging the log with at least one pair of clamps;

c) dwelling the log in a ready position on a heated portion of the surface; and d) moving the carriage assembly to pass the log longitudinally over a blade supported on the table assembly in order to cut a slice of veneer.

16. The method for manufacturing veneer according to claim 15, further including the step of:

e) returning the log to the ready position.

17. The method for manufacturing veneer according to claim 16, further including the step of:

f) repeating steps (c)–(e) until a desired amount of log remains uncut.

18. The method for manufacturing veneer according to claim 15, wherein the cutting a slice of veneer cuts the veneer longitudinally from the log.

19. The method for manufacturing veneer according to claim 15, wherein the receiving at least one log occurs either on a first end plate or an opposed second end plate of the table assembly.

20. The method for manufacturing veneer according to claim 16, wherein the returning of the log to the ready position includes the step of lifting the log out of contact with the table assembly for at least a portion of a return stroke.

21. The method for manufacturing veneer according to claim 15, wherein step (b) includes engaging at least two logs with the carriage assembly.

22. The method for manufacturing veneer according to claim 15, further including the step of controlling the method using a control system.

* * * * *

UNITED STATES PATENT AND TRADEMARK OFFICE

CERTIFICATE OF CORRECTION

PATENT NO. : 7,028,729 B2
APPLICATION NO. : 10/386844
DATED : April 18, 2006
INVENTOR(S) : Constantine et al.

It is certified that error appears in the above-identified patent and that said Letters Patent is hereby corrected as shown below:

On the title page insert
-- (73), Assignee Apollo Hardwoods Company, LLC, Coraopolis, PA, (USA) --

Signed and Sealed this

Twentieth Day of March, 2007

JON W. DUDAS
*Director of the United States Patent and Trademark Office*